United States Patent [19]

Standridge

[11] 3,854,630

[45] Dec. 17, 1974

[54] APPARATUS FOR INJECTING COLORANT INTO INJECTION MOLDING MACHINE

[75] Inventor: Robert E. Standridge, Covington, Ga.

[73] Assignee: Evans Products Company, Portland, Oreg.

[22] Filed: Apr. 4, 1973

[21] Appl. No.: 347,896

[52] U.S. Cl. .............................. 222/135, 222/145
[51] Int. Cl. .............................................. B67d 5/52
[58] Field of Search ......... 222/133, 135, 57, 61, 56, 222/145, 239, 255, 240

[56] References Cited
UNITED STATES PATENTS 2,885,119  5/1959  Carriol ........................ 222/135 X
3,228,065  1/1966  Cournoyer et al. ............. 222/57 X Primary Examiner—Evon C. Blunk
Assistant Examiner—James M. Slattery
Attorney, Agent, or Firm—Klarquist, Sparkman, Campbell, Leigh, Hall and Whinston

[57] ABSTRACT

Colorant injected into molding machine at lower end of raw material hopper so as to be dispersed solely on such material. System disclosed for accurately controlling amount of colorant dispersed onto raw material.

6 Claims, 4 Drawing Figures

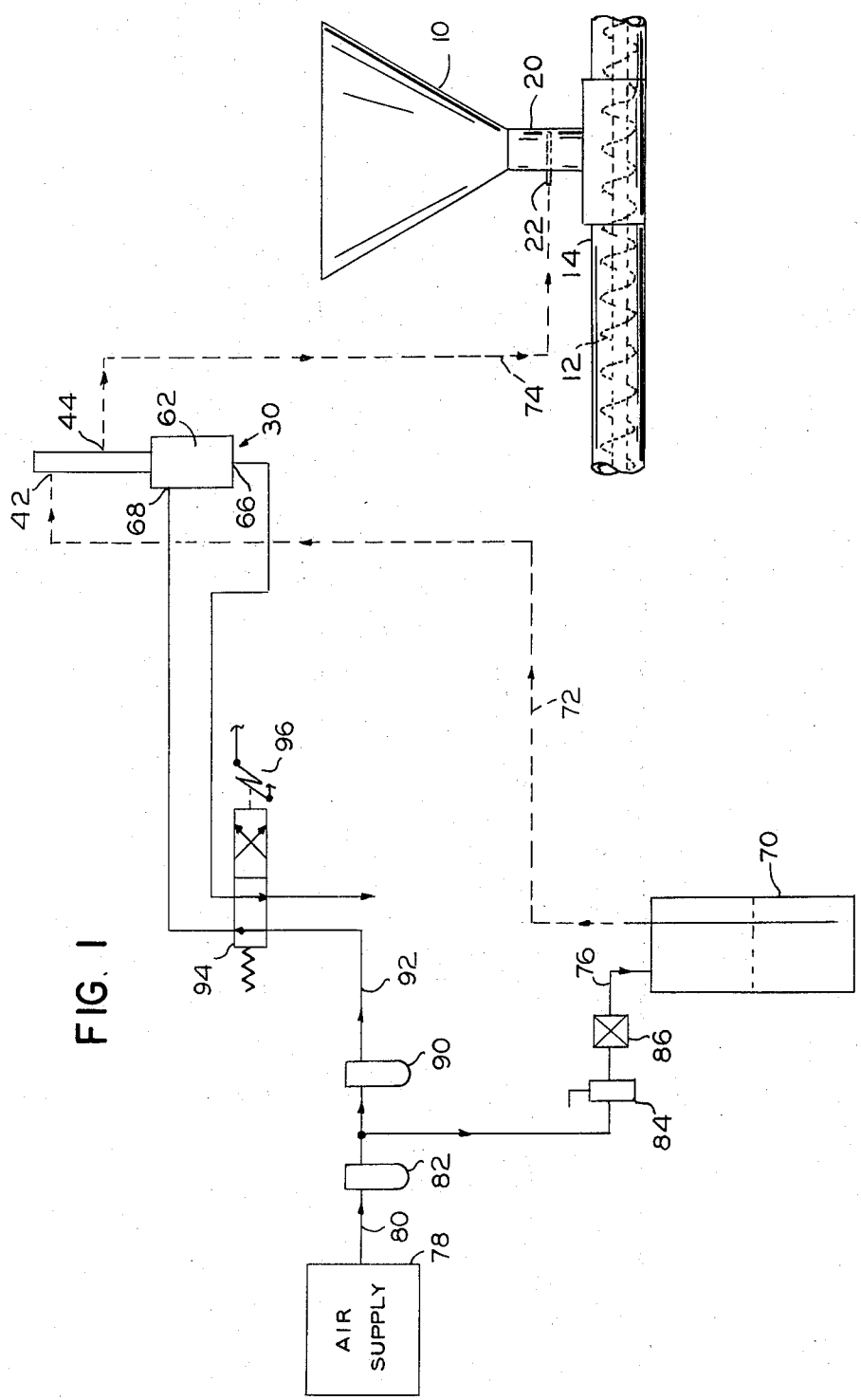

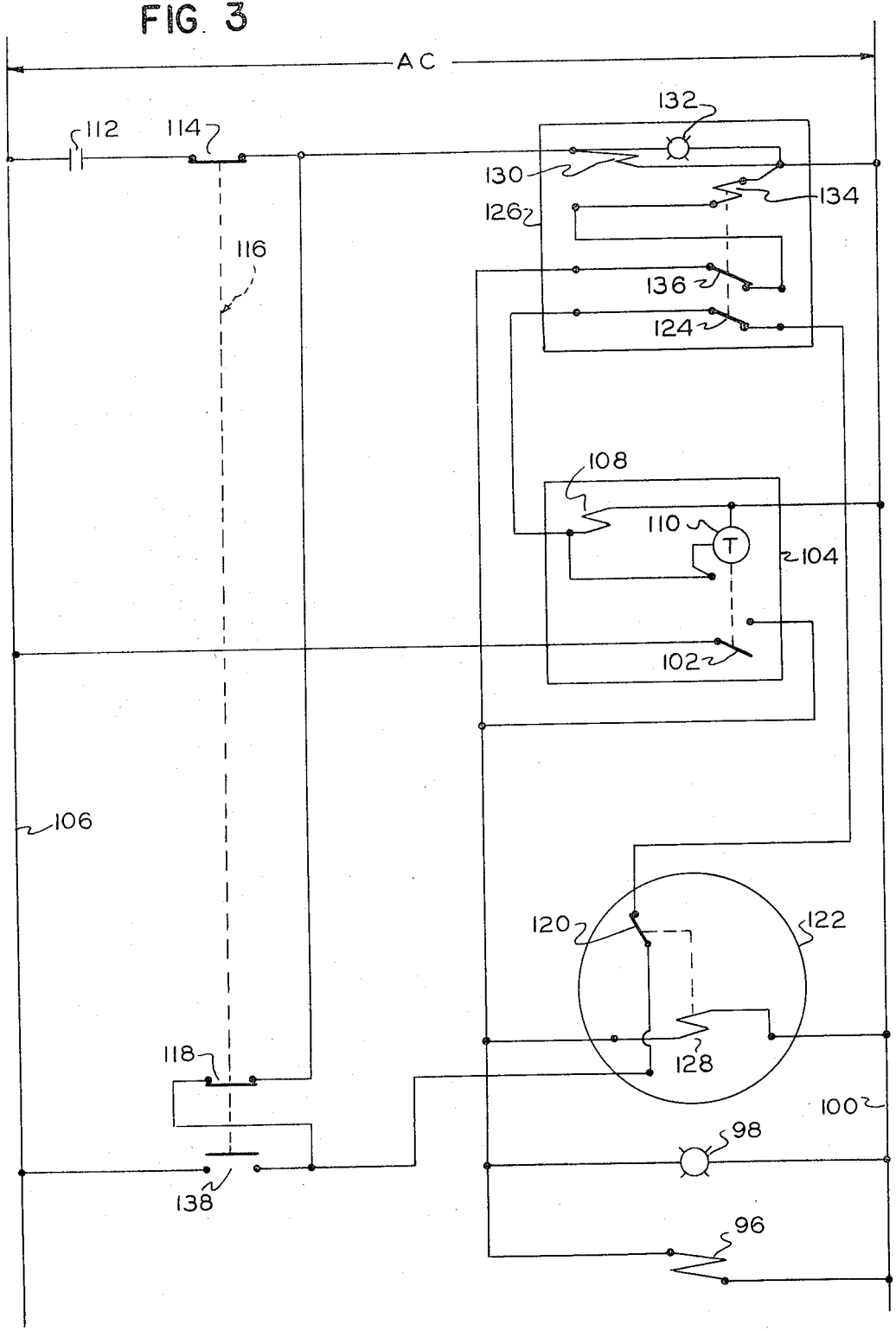

APPARATUS FOR INJECTING COLORANT INTO INJECTION MOLDING MACHINE

BACKGROUND OF THE INVENTION

In the injection molding of plastic materials the raw plastic material is usually obtained in the form of small colorless, white or off-white pellets. These are fed by a screw-type plunger which because of pressure and additional heat which may be applied causes the plastic material to melt so that it can be injected into the mold for forming the desired part. If the part is to have a particular color it has been the practice heretofore to add a coloring agent to the raw plastic material just as it enters the screw-type plunger. As the material is fed by the screw towards the injection end of the cylinder containing the screw, the coloring material is mixed with the plastic. Much difficulty has been encountered, however, in this prior apparatus in obtaining uniform distribution of the coloring material and in controlling the amount of coloring material which is added.

BRIEF DESCRIPTION OF THE INVENTION

The present invention relates to a new and improved arrangement for adding coloring material to the plastic being utilized in an injection molding machine.

In accordance with the invention, colorant is injected into the throat of the hopper of raw plastic material at a point spaced above the screw plunger of an injection molding machine, such that none of the colorant will be deposited upon the screw itself but all will be caught on and retained by the plastic pellets of the material to be molded. The amount of colorant dispersed is accurately controlled by utilizing an air operated injector pump and a control circuit arranged so that the pump supplies an accurate amount of colorant for each stroke of the pump plunger.

Further objects and advantages of the invention will become apparent from the detailed description hereinafter set forth.

DRAWINGS

FIG. 1 is a schematic drawing of the system of the invention;

FIG. 3 is a circuit diagram of the control circuit utilized in the subject invention.

DETAILED DESCRIPTION OF THE INVENTION

Figure 2:
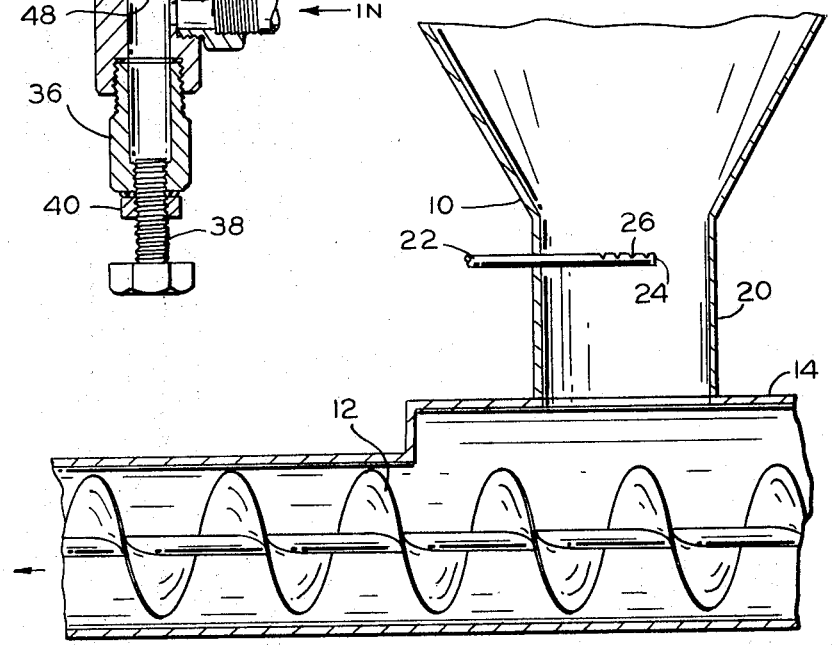
FIG. 2 is a fragmentary semischematic sectional view of the hopper and screw of an injection molding machine.

Referring to FIGS. 1 and 2, indicated at 10 is the hopper of an injection molding machine which is mounted over a screw-type plunger 12 adapted to feed and liquify pelletized plastic material which is fed from the hopper 10 into the plunger towards the injection end of the cylinder 14 in which the plunger is mounted. As will be understood, the plunger 12 is rotated as it is withdrawn in the cylinder 14 so as to cause plastic material to be fed toward the injection end of the cylinder. During this operation the plastic pellets from the hopper 10 feed into the screw plunger 12.

Referring more particularly to FIG. 2, the hopper 10 converges at its lower end into cylindrical portion 20 which may have a diameter 4 to 6 inches. In accordance with the invention a colorant is dispersed onto the pellets contained in the hopper feed portion 20 at a point about 6 inches above the screw 12. The illustrated means comprises a tube 22 extending through the side wall 20, the inner end 24 of the tube being closed. The tube 22 is provided with four notches 26 positioned about one-fourth inch apart and facing upwardly, two of the notches being positioned on each side of the center line of the tube 20 so that material fed through the tube 22 will be sprayed upwardly through the notches 26 onto the pellets being fed from the hopper. It has been found important that the colorant material be sprayed upwardly to make certain that it is caught upon the plastic pellets and does not fall upon the screw 12.

Figure 4:
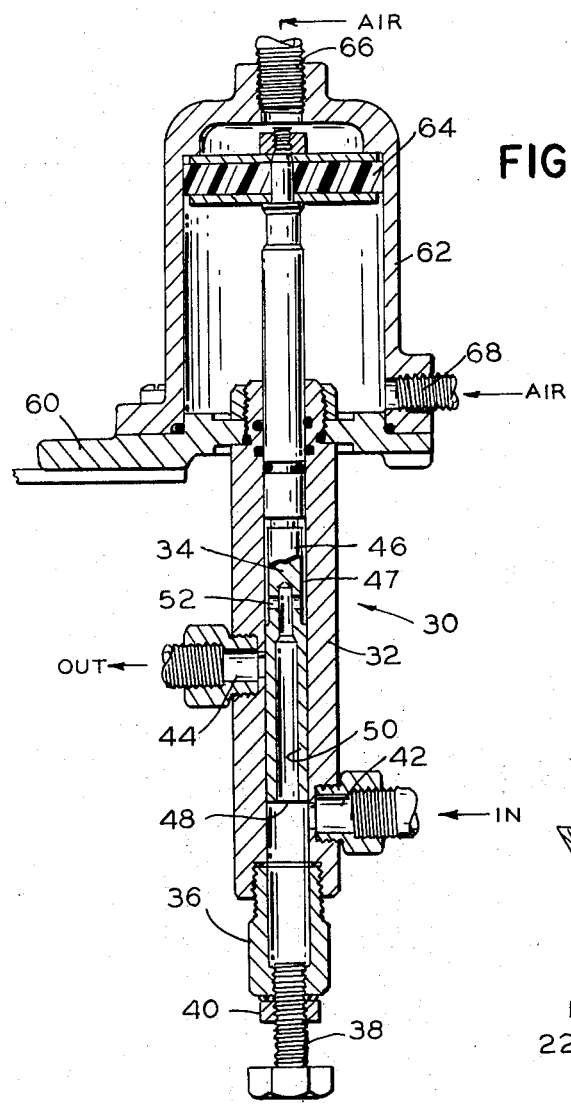
FIG. 4 is a cross sectional view of the air operated ejector pump utilized in the system of the invention.

The colorant preferably is supplied to the tube 22 through an air operated ejector type pump illustrated in FIG. 4. A suitable pump of this type is Model 83578, Series D of McNeil Corporation. Referring to FIG. 4 the pump 30 includes a main cylinder or body portion 32 in which is slidably mounted a plunger 34. Threadably engaged on the end of the cylinder 32 is a nose adapter 36 which threadably receives an adjusting screw 38 adapted to be locked into position by a nut 40. The cylinder 32 is provided with an inlet 42 and an outlet 44. The plunger 34 is provided with a section 46 of reduced diameter by being relieved at 47 around its periphery a predetermined distance from the end 48 of the piston. The piston is also provided with a bore 50 extending inwardly from the end 48 which communicates with a diametric opening 52 which in turn communicates with the relieved portion 47 in the side wall of the piston. The cylinder 32 is suitably secured to a mounting base 60 on which is also mounted a closed end cylinder 62 of an air motor for effecting reciprocation of the plunger 46. The plunger 46 is connected to a piston 64, the cylinder having an air inlet 66 adjacent the closed end thereof and a second inlet 68 adjacent the base 60. By appropriate admission of air to the cylinder 62, the piston 64 and thus the plunger 46 can be reciprocated. The operation of the ejector pump 30 will be described in more detail subsequently.

Referring again to FIG. 1, the ejector pump 30 is fed colorant material from a reservoir 70 through a line 72 connected to the inlet 42 of the ejector pump 30. The outlet 44 of the pump 30 is connected by a line 74 to the tube 22 extending into the hopper 10. The colorant reservoir 70 is a sealed vessel having air under pressure supplied to the top thereof through a line 76 which in turn is connected to suitable source of air 78 through an air line 80, a filter 82, a valve 84, and a pressure regulator 86. The air source 78 also supplies air to effect reciprocation of the plunger 46. Air is supplied in this manner through the line 80, thence through an oiler 90 in a line 92 to a four-way solenoid operated control valve 94 which is adapted to control the admission of air into the inlets 66, 68 of the cylinder 62. The system for controlling the operation of the air valve 94 will now be described.

According to the control system utilized in the subject invention, solenoid 96 operates valve 94 against a spring return bias for reversing the application of air pressure as between inlets 66 and 68 of cylinder 62. Referring to FIG. 3, solenoid 96, shunted by pilot light 98, is connected between a first AC line 100 and the normally open contacts 102 of adjustable timer 104, through which the energizing circuit of solenoid 96 is completed to second AC line 106. Adjustable timer 104 includes an operating coil 108 connected in parallel with a timed operating coil 110 for closing the contacts 102 after a predetermined, adjustable time period. Adjustable timer 104 is suitably a CE 300 series adjustable timer manufactured by Eagle Signal, Davenport, Iowa.

Adjustable timer 104 is energized via a circuit comprising control contacts 112, normally closed contacts 114 of selector switch 116, second normally closed contacts 118 of selector switch 116, normally closed contacts 120 of a preset timer 122, and normally closed contacts 124 of counter 126, all disposed in series between AC line 106 and the paralleled operating coils 108 and 110 of timer 104, the remaining terminals of coils 108 and 110 being returned to AC line 100. Contacts 112 close when plunger 12 in FIG. 2 starts to rotate in its return after an injection stroke to fill a mold. Then, after a predetermined adjustable period of time as goverened by the setting of timer 104, the operating coil 110 is energized through the abovementioned series circuit for closing contacts 102 and energizing solenoid 96. As a result, valve 94 is operated for introducing air into inlet 66 of ejector pump 30 whereby plunger 34 executes one stroke for introducing a charge of colorant material via line 74.

Solenoid 96 is shunted by operating coil 128 of a preset timer 122, the latter having normally closed contacts 120 which open after a second predetermined time delay. Preset timer 122 is suitably a CG series time delay relay manufactured by Eagle Signal, Davenport, Iowa. After such second predetermined time delay, contacts 120 break the circuit to operating coils 108 and 110 of timer 104 such that contacts 102 open, thereby de-energizing solenoid 96. Consequently, solenoid valve 94 returns to its original position as schematically illustrated in FIG. 1 whereby air under pressure is introduced through inlet 68 of cylinder 62, causing the plunger 34 of pump 30 to return to its original position as illustrated in FIG. 4. When solenoid 96 is de-energized, operating coil 128 of preset timer 122 is also de-energized since the two are paralleled, whereby contacts 120 return to their normally closed position. When contacts 120 close, the original circuit for energizing adjustable timer 104 is restored and consequently the cycle repeats for bringing about the reciprocation of plunger 34 of pump 30.

Counter 126 is employed for controlling the over-all quantity of colorant material added to the plastic pellets during the withdrawal and rotation of screw plunger 12. Clutch coil 130 of the counter, in parallel with pilot light 132, is interposed between AC line 100 and the junction of normally closed pushbutton contacts 114 and 118. When contacts 112 are closed for energizing the control circuit of FIG. 3, counter 126 is started from a preset count selected according to the number of reciprocations of plunger 34 desired. A counting coil 134 is effective for stepping the counter toward zero, and when the zero condition is reached, normally closed contacts 124, together with normally closed contacts 136, are opened. The opening of contacts 124 disconnects the operating coils of timer 104 such that no further reciprocation of plunger 34 will take place until contacts 112 are re-opened for de-energizing counter 126 causing the counter to return to its original preset condition.

The counting coil 134 of counter 126 is disposed in series with normally closed contacts 136, and this series combination is paralleled with solenoid 96. Thus, counter 126 counts the reciprocations of the plunger of pump 30 by advancing one count each time solenoid 96 is energized. When the zero position of the counter is reached, normally closed contacts 136 open, breaking the circuit to counting coil 134. Counter 126 suitably comprises the type HZ 170 counter manufactured by Eagle Signal, Davenport, Iowa.

A "jogging" operation is manually produced through operation of selector switch 116, having the aforementioned normally closed contacts 114, 118, and also having normally open contacts 138 serially interposed between AC line 106 and the junction between contacts 118 and normally closed contacts 120 of preset timer 122. As long as this selector switch is operated for closing contacts 138, while opening contacts 114, 118, the plunger 34 will continue to cycle without regard to the number of reciprocations. Opening of contacts 114 and 118 disconnects the clutch and counting coils of the counter at this time.

According to the operation of the above described circuit, the first strike of air cylinder 94, and consequently the first stroke of the plunger of pump 30, awaits the time-out of timer 104. The pump 30 then executes one stroke while preset timer 122 is running, and when the last mentioned timer times out, the pump plunger returns while adjustable timer 104 runs. The adjustable timer 104 is suitably preset to apply the colorant material evenly over the rotation of screw plunger 12. The interval of colorant charges is determined to provide the spread of colorant desired. If, for instance, counter 126 is preset to a count of five, the timer 104 is suitably adjusted to apply the resulting five charges of color material evenly over the Period of screw rotation. The number of charges set by counter 126 is governed by the total quantity of colorant desired.

In operation of pump 30, ejector plunger 34 acts as the inlet-outlet valve. In the position shown for the ejector pump in FIG. 4, color material is introduced under pressure through inlet 42 and fills the pumping cylinder including bore 50. When piston 64 is operated by introduction of air through air inlet 66, plunger 34 is moved downwardly, as viewed in FIG. 4, thereby closing inlet 42. Colorant material is expelled through opening 52 into relieved portion 47 in the side wall of the plunger, and as the plunger moves downwardly closing the aforementioned inlet 42, it will be seen that relieved portion 47 communicates with outlet 44. Each time the downward stroke of the plunger occurs, a predetermined quantity of colorant material is delivered via line 74 to tube 22, the said colorant material being sprayed upwardly through the notches 26 as hereinbefore described. It will be noted that the ejector pump has a stroke adjustment screw 38 to adjust accurately the quantity of colorant delivered during each stroke. Therefore the application of colorant material can be accurately predetermined by controlling the number of strokes and the length of stroke of the plunger 34 during each cycle.

Because of the dispersal of colorant solely upon the plastic pellets and the relatively even distribution thereof during the filling of the cylinder 14 uniform coloring of the plastic injected into a mold is obtained with only about one-half the amount of colorant required as compared to prior colorant injection systems with which I am familiar.

The system of the invention can obviously be adapted for use with plastic extruding equipment so as to inject colorant into the raw plastic material process with such equipment.

Having illustrated and described a preferred embodiment it should be apparent that the invention permits of modification in arrangement and detail.

I claim:

1. In a plastic processing apparatus having a cylinder, a screw within said cylinder and a hopper mounted above and communicating with said cylinder for retaining a supply in pellet form of the plastic material to be processed, the invention comprising:

a liquid material dispersing means extending into said hopper at a position a short distance above said cylinder, sufficient that said screw is shielded from said dispersing means by said pellets to prevent liquid material extruded from said dispersing means from falling upon said screw;

pressurizable supply means for retaining a supply of the liquid material under pressure;

and means communicating with said supply means and said dispersing means for supplying a predetermined amount of said liquid material from said supply means to said dispersing means at predetermined intervals.

2. In a plastic processing apparatus having a cylinder, a screw within said cylinder and a hopper mounted above and communicating with said cylinder for retaining a supply in pellet form of the plastic material to be processed, the invention comprising:

a liquid material dispersing means extending into said hopper a short distance above said cylinder, sufficient that said screw is shielded from said material by said pellets to prevent liquid material extruded from said dispersing means from falling upon said screw;

pressurizable supply means for retaining a supply of the liquid material under pressure;

and pump means communicating with said supply means and said dispersing means for supplying a predetermined amount of said liquid material to said dispersing means at predetermined intervals, said pump having a cylinder with an inlet communicating with said supply means and an outlet communicating with said dispersing means, a piston slidable in said cylinder from a first position closing said outlet to a second position closing said inlet, and means communicating the inlet end of said cylinder with said outlet for passage of liquid material therethrough during traverse of said piston from said first position to said second position.

3. In a plastic processing apparatus having a cylinder, a screw within said cylinder and a hopper mounted above and communicating with said cylinder for retaining a supply in pellet form of the plastic material to be processed, the invention comprising:

a liquid material dispersing means extending into said hopper at a position a short distance above said cylinder, sufficient that said screw is shielded from said dispersing means by said pellets to prevent liquid material extruded from said dispersing means from falling upon said screw;

pressurizable supply means for retaining a supply of liquid material;

and pump means for pumping a predetermined amount of said liquid material from said supply means to said dispersing means at predetermined intervals;

said pump means having a cylinder closed at one end, an inlet in communication with said supply means adjacent to but spaced from said end and an outlet in communication with said dispersing means spaced more remotely from said one end than said inlet;

a piston slidable in said cylinder from a position with one end of said piston abutting said cylinder one end in which position said piston closes said inlet to a position where said piston closes said outlet;

said piston being relieved along its periphery for a predetermined distance at a location on said periphery remote from said one end thereof to communicate with said outlet during a predetermined portion of the stroke of said piston;

said piston being counterbored from said one end and having an opening extending from said counterbore to said relieved peripheral portion;

said relieved portion being positioned so as to commence communication with said outlet port during the movement of said piston toward said cylinder one end immediately upon passage of said piston over said inlet whereby further movement of said piston toward said cylinder one end will cause liquid material within said cylinder to be forced out of said outlet.

4. In a plastic injection molding apparatus having a cylinder and screw-type plunger therein for injecting the plastic material into the molds of such apparatus by the thrust of said plunger, the cylinder being refilled during rotative retraction of said plunger, and a hopper mounted above and communicating with said cylinder for retaining a supply in pellet form of the plastic material to be molded, the invention comprising:

a liquid material dispersing tube extending into said hopper at a position a short distance above said cylinder, sufficient that said plunger is shielded from said tube by said pellets to prevent liquid material extruded from said tube falling upon said plunger;

pressurizable supply means for retaining a supply of the liquid material under pressure;

and pump means for pumping a predetermined amount of said liquid material to said tube during each retraction stroke of said plunger;

said pump means having a cylinder closed at one end, an inlet adjacent to but spaced from said end and an outlet spaced more remotely from said one end than said inlet;

a piston slidable in said cylinder from a position with one end of said piston abutting said cylinder one end in which position said piston closes said inlet to a position wherein said piston closes said outlet;

said piston being relieved along its periphery for a perdetermined distance at a location on said periphery remote from said one end thereof to communicate with said outlet during a predetermined portion of the stroke of said piston;

said piston being counterbored from said one end and having an opening extending from said counterbore to said relieved peripheral portion;

said relieved portion being positioned so as to commence communication with said outlet port during the movement of said piston toward said one cylinder end immediately upon passage of said piston over said inlet whereby further movement of said piston toward said cylinder one end will cause liquid material within said cylinder to be forced out of said outlet.

5. Apparatus as set forth in claim 4 wherein said pressurizable supply means comprises a sealed reservoir for said liquid material;

a conduit connecting said cylinder inlet to the bottom of said reservoir;

a supply of air under pressure;

and means connecting said air supply to the upper portion of said reservoir whereby liquid material therein is constantly urged toward said cylinder inlet.

6. Apparatus as set forth in claim 4 including drive means for said pump piston for effecting a predetermined number of strokes thereof at predetermined intervals during said rotative retraction of said plunger.

* * * * *